United States Patent [19]

Carmichael et al.

[11] Patent Number: 4,923,110
[45] Date of Patent: May 8, 1990

[54] PROCESS USING PROTECTIVE FLUX COATINGS FOR DELAYING, SOLDERING AND LOW TEMPERATURE BRAZING OPERATIONS, AND FLUX SOLUTIONS THEREFOR

[76] Inventors: Arthur O. Carmichael, 7830 Bransbury, Union Lake, Mich. 48085; Seymour A. Genden, 15100 Darmouth, Oak Park, Mich. 48237

[21] Appl. No.: 291,548

[22] Filed: Dec. 29, 1988

Related U.S. Application Data

[63] Continuation-in-part of Ser. No. 8,853, Jan. 30, 1987.

[51] Int. Cl.$^5$ .............................................. B23K 35/34
[52] U.S. Cl. ...................................... 228/214; 148/23
[58] Field of Search ....................... 228/207, 223, 214; 148/23, 25

[56] References Cited

U.S. PATENT DOCUMENTS 4,738,732  4/1988  Anderson et al. .................... 148/23

OTHER PUBLICATIONS

"The Fine Art of Soldering with So-So Solder and Flux", p. 72, Nibco, Inc., taken from a copyrighted book by H. A. Sosnin.

*Primary Examiner*—Kurt Rowan
*Attorney, Agent, or Firm*—Irving M. Weiner; Robert M. Petrik; Joseph P. Carrier

[57] ABSTRACT

A flux coating for treating a clean metallic component having a fluid channel defined through at least a portion thereof to provide a durable, tack-free, protective flux film on a surface of the portion so that the component can be fluid-tightly soldered or low temperature brazed to a mating metallic component at a later time without cleaning and fluxing the portion of the component at the later time. The solution consisting essentially of rosin and a highly volatile organic solvent, the solution being adapted to rapidly air dry when coated on the surface of the portion to leave a very thin, protective flux film on the surface of the component, the component being capable of being stored for long periods of time, handled, assembled, shaped, formed and otherwise worked without removal of the film from the surface of the component and without reduction of the fluxing properties of the film.

18 Claims, 1 Drawing Sheet

PROCESS USING PROTECTIVE FLUX COATINGS FOR DELAYING, SOLDERING AND LOW TEMPERATURE BRAZING OPERATIONS, AND FLUX SOLUTIONS THEREFOR

This application is a continuation-in-part of U.S. Ser. No. 008,853, filed Jan. 30, 1987.

BACKGROUND OF THE INVENTION

1. Field of the Invention

The present invention relates to protective flux coatings for use in the plumbing, refrigeration and HVAC industries, and to a process for applying and utilizing such coatings by applying thin, protective flux films to parts such as tubing, valves, fittings, heat exchange elements, etc. More particularly, the present invention relates to a process for applying thin protective flux films to cleaned metal surfaces of the discussed parts, whereby soldering joining operations can be rapidly effected after long periods of storage or delay, and also relates to simple flux coating solutions used in generating the protective flux films.

2. Description of Relevant Art

Conventional soldering processes for fluid-tightly joining components include three basic steps: (1) preparation of components to be soldered by cleaning the surfaces to be joined to ensure the surfaces are free of contaminants and applying a flux to the cleaned surfaces; (2) joining the cleaned and fluxed surfaces of the components by fitting the components together, applying heat to fitted components and applying solder to the heated surfaces; and (3) cleaning the joined components of residual flux and solder, commonly known as "wiping the joint".

There are many known soldering fluxes used in the plumbing industry, the refrigeration industry and the heating, ventilating and air-conditioning (HVAC) industry for joining components such as tubing, valves, fittings, heat exchange elements, etc. which are comprised of copper and/or copper alloys. The known soldering fluxes are in paste form, liquid form, powder form, gaseous form and integral solder/flux form. All of the known fluxes are designed to be used within a relatively short period of time (minutes) between preparation of the components, by cleaning the appropriate surfaces and applying the fluxes thereto, and joining operations involving the fluxed components. Paste fluxes are by their nature untidy, usually having petroleum jelly as a carrier or base. The untidy nature of paste renders any intermediate operations involving the fluxed parts difficult, and paste consistency leaves no durable protective coating. Liquid fluxes which are watery for ease of use and penetration, leave no durable protective film and are designed for immediate use. Powder fluxes are either mixed with a fluid to form a paste or are used in a powder form. In either form, the powder fluxes are also untidy, designed for immediate use, and leave no durable protective coating. Gaseous fluxes create an atmosphere about the parts to be soldered. As will be understood, gaseous fluxes have limited applicability (they cannot be used under field conditions or the like) because of their very nature, and leave no durable protective coating. Integral solder/fluxes by their very nature prohibit the interjection of time between preparation and joining of parts.

The known soldering fluxes are disadvantages for use in the plumbing, refrigeration and HVAC industries for several reasons. One significant reasons is the requirement of soldering the flux coated components within a short time after the flux coatings have been applied thereto. In other words, there cannot be any substantial pause between the first two steps of the conventional soldering process discussed above. This requirement substantially increases the time and inconvenience conventionally associated with soldering of plumbing, refrigeration and HVAC components at a job site inasmuch as the components cannot be pre-fluxed at a more convenient location (such as a workshop) and then transported to the job site for completing the soldering process.

Furthermore, the known flux coatings are generally rather messy and/or difficult to handle; cannot be easily applied to parts in a highly uniform manner.

Also, most soldering processes using known fluxes result in a quantity of excess flux and flux carrier remaining on the components after they have been soldered together, whereby the excess flux and flux carrier must be removed from the components in the final (cleaning) step of the conventional soldering process discussed above.

Another disadvantage associated with many conventional fluxes, particularly petroleum jelly based fluxes, occurs when components are being soldered together above the person performing the soldering operation. In such situations the heated flux can, in part, drip or flow down on the person inflicting a skin burn.

The present invention effectively overcomes the problems and disadvantages attendant to conventional soldering fluxes used in the plumbing, refrigeration and HVAC industries. Relatedly, the present invention significantly facilitates the soldering processes used in the discussed industries, and permits the inclusion of other optional operations such as storage, transportation and forming of components between the conventional fluxing and joining steps.

Many of the advantages of the present invention when applied to soldering operations are also available to low temperature brazing operations.

SUMMARY OF THE INVENTION

According to the present invention, there is provided a process for cleaning, fluxing and thus preparing a metallic component having a fluid channel defined through at least a portion thereof so that the component can be fluid-tightly soldered to a mating metallic component at a later time without recleaning and refluxing the metallic component at the later time. The process comprises the steps of: providing a metallic component having a fluid channel defined through at least a portion thereof; ensuring that a surface of the portion is free of contaminants; providing a flux coating solution including a flux solute and a highly volatile solvent which is adapted to rapidly air dry within one minute when coated on a surface to leave a very thin protective flux film on the surface; applying the flux coating solution to the surface of the portion of the component and air drying the applied solution to leave a thin durable flux film on the surface of the portion so that the component can be fluid-tightly soldered to a mating component at a later time without recleaning and/or refluxing of the portion of the component at the later time. The metal component having the thin, durable protective flux film thereon is capable of being handled, assembled, bent, worked, packaged, stored for long periods of time, shipped etc., without removal of the thin, durable protective flux film, and without reduction of the film's protective and fluxing properties.

One object of the present invention is to provide pre-cleaned and prefluxed plumbing, refrigeration and HVAC components which can be stored for long periods (month and years), handled, assembled, shaped, formed, worked, packaged, shipped, etc. prior to the final soldering operation.

Another object of the present invention is to minimize work time associated with job site installations of plumbing, refrigeration and HVAC components by substantially reducing (and eliminating in some situations) the need for cleaning and fluxing of components at the job sites, thereby reducing field labor costs.

Still another object of the present invention is to eliminate a final cleaning step conventionally required with plumbing, refrigeration and HVAC soldering methods using conventional soldering fluxes.

Still another object of the present invention is to provide a simple flux coating solution which can be easily applied to plumbing, refrigeration and HVAC components to rapidly form (within a minute or less under ambient conditions) a tack-free, durable, protective flux film on the surfaces of components.

Still another object of the present invention is to provide such a coating solution which can be rapidly applied to plumbing, refrigeration and HVAC components in an automated process (or by robots).

An additional object of the present invention is to provide a tack-free, protective flux film for plumbing, refrigeration and HVAC components which is clear, thereby enabling visual inspection of the coated surfaces of the components at any time prior to a final fitting and soldering of the components.

Yet a further object of the present invention is to provide a very thin (varnish like), uniformly distributed, protective flux film for the surfaces of plumbing, refrigeration and HVAC components which will substantially completely evaporate during soldering operations involving the components, to thereby eliminate a final cleaning step which is required with the use of conventional flux coatings, and to also avoid flesh burns from hot flux dripping/flowing down on users when soldering overhead.

The above and further objects, features and advantages of the present invention will become apparent from the following detailed description of preferred embodiments of the invention, when read in conjunction with the accompanying drawings.

DETAILED DESCRIPTION OF THE PREFERRED EMBODIMENTS

The accompanying drawings illustrate two mating components which have been cleaned and coated with a protective flux film (or prepared for soldering) according to the present invention. The components are shown in side view and in cross-section, prior to and after the components have been fitted together.

By way of illustration and not limitation, there are shown two components 2, 4 of a tubular shape having end portions thereof which are constructed to be mated or fitted together in a male/female coupling. It will be understood, however, that protective flux films according to the present invention can be applied to any metallic components used in the plumbing, refrigeration and HVAC industries which have a fluid channel defined through at least a portion thereof, and which are required to be joined and soldered together for effective, fluid-tight assembly of the components. Component 2 has a thin film 6 formed on an inner surface of an end portion thereof, while component 4 has a thin film 8 formed on an outer surface of an end portion thereof.

Figure 1:
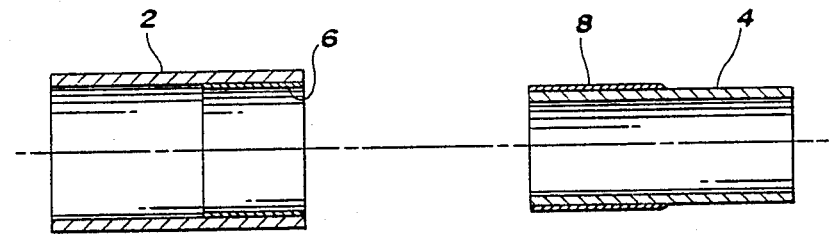
FIG. 1 illustrates a view in cross-section of two mating components which have had a thin flux film applied therto using a coating solution and methods according to the present invention.
Figure 2:
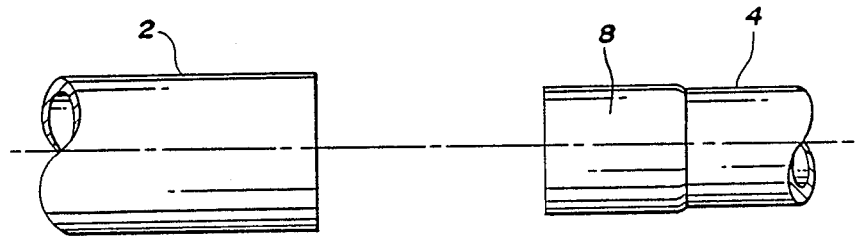
FIG. 2 is a view similar to FIG. 1 in which the parts are shown in side view rather than cross-section.
Figure 3:
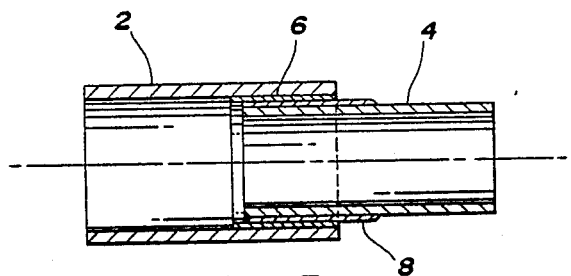
FIG. 3 illustrates a view similar to FIG. 1, but in which the mating components have been fitted together.
Figure 4:
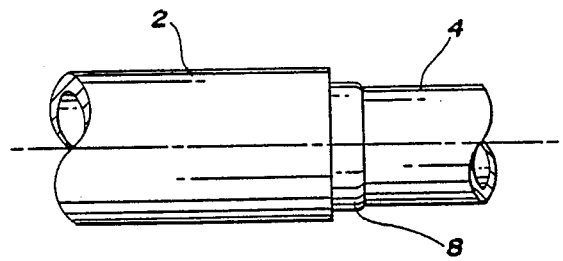
FIG. 4 illustrates a view similar to FIG. 2, but in which the mating components have been fitted together.

Referring now to FIGS. 1 and 2, there is shown an end portion of a first component 2 and an end portion of a second component 4 adapted to be mated or fitted with the first component 2. Particularly, the outer diameter of the end section of the second component 4 is slightly smaller than the inner diameter of the end section of the first component 2, whereby the end section of the second component 4 can be closely fitted or mated within the end section of the first component 2. Note that plumbing, refrigeration and HVAC components are manufactured in standardized sizes with close tolerances for being properly joined together in soldering operations.

The present invention is particularly applicable to soldering processes involving components constructed of copper or copper alloys, as conventionally used in the plumbing and HVAC industries. It will be understood, however, that the present invention is not so limited. For example, the flux coating solutions and protective flux films according to the present invention have been applied to components which are comprised of copper or copper alloys and these components have been subsequently, successfully joined using low temperature brazing techniques, and with all of the attendant advantages of the present invention. Low temperature brazing is commonly used in the refrigeration and HVAC industries.

The mating surfaces of the components 2, 4 are initially cleaned by known cleaning process, which may include chemical and/or mechanical cleaning, to remove all dirt, grease, oil, oxides, moisture and other contaminants thereon. Note that such cleaning operation may be carried out in an automated manner. Such an automated cleaning operation would preferably brush, sand, machine or otherwise abrade the component surfaces to remove oxides.

Once the surfaces of the components are satisfactorily cleaned, a flux coating solution according to the present invention is applied thereto in a simple, controlled manner, such as dipping, spraying, brushing, rolling, foaming, wave fluxing, etc., and permitted to dry to leave a thin, durable, protective flux film on the surfaces of the components. The flux coating solution according to the present invention has a very simple composition of a flux solute and a highly volatile organic solvent. Such solvents include suitable alcohols, chlorinated hydrocarbons, aromatics, etc. Preferably, the flux coating solution will be comprised of only rosin and a highly volatile organic solvent which is adapted to rapidly air dry within a minute or less when coated on surfaces of components. A particularly preferred solvent according to the present invention is 1, 1, 1 trichloroethane. Coating solutions using this preferred solvent air dry within one minute (as little as 20–30 seconds) at a normal ambient temperature of 72° F. to leave a tack-free, durable, protective flux film on coated parts. Optionally, the flux coating solution may contain a conventional activating agent if an activated flux is desired. Of course such activating agent would have to be compatible with the flux and the solvent.

One desirable aspect of the present invention is that it applies the protective flux film uniformly over the entire surfaces to which the coating solution is applied, which in turn results in a more uniform soldered joint when the surfaces (of components) are subsequently soldered together, and also prevents waste.

Another desirable aspect of the present invention is that the thickness of flux films applied to component surfaces can be easily and precisely controlled. For example, if the coating solution is to applied in a dipping process, the thickness of a flux film resulting therefrom can be easily controlled/modified by either changing the ratio of solute to solvent in the coating solution and/or by passing components through different numbers of dip-dry cycles.

In this regard, the protective flux films according to the present invention will preferably be very thin, such that the coatings are varnish-like or substantially non-discernable on the components. Most preferably, the coatings will be less than 0.001 inch thick. Such very thin films are advantageous for several reasons. For example, the use of very thin films does not change the standardized dimensions of the plumbing, refrigeration and HVAC components to any appreciable extent, whereby the standardized components can still be fitted or mated together very easily and whereby the capillary action which draws molten solder into the lap joint between mated components in subsequent soldering operations will not be hindered in any way.

Also, the use of very thin films is readily adaptable to applying clear protective flux films to component surfaces, which is another preferred aspect of the present invention. Particularly, protective flux films according to the present invention are preferably clear to thus permit convenient visual inspection of the protected surfaces to verify retained cleanliness at any time prior to fitting and soldering of the components.

Protective flux films according to the present invention are not only simple to generate and apply to components, but also have excellent durability. Components having the thin films coated thereon may be handled, assembled, shaped, formed, bent or otherwise worked, packaged and unpackaged, stored for long periods of time (months and years), and/or shipped according to conventional practices without removal of the protective films from component surfaces (through evaporation, flaking, chipping, rubbing off, etc.) and without reduction of the films, surface protecting and fluxing properties. In this regard, the fact the protective flux films are not easily removed from the surfaces of components (such as by being rubbed off or flaking off) is particularly advantageous because it permits the components to be easily handled according to conventional techniques, or without the need for any additional precautionary measures to protect persons handling the components from the protective flux films.

As an example, several copper tubes and fittings were dipped in a flux solution according to the present invention containing 15% by weight rosin and 85% by weight 1, 1, 1 trichloroethane. The tubes and fittings were then allowed to air dry at an ambient temperature of 72°0 F., whereby the 1, 1, 1 trichloroethane rapidly evaporated within one minute to leave a tack-free, protective flux film on the components, the film having a thickness of less than 0.001 inch. The components were then subjected to a variety of conditions. Initially, the components were placed together in a sack such that they directly contacted and bumped against each other. Over the next six months the components were regularly handled and inspected to determine if there was any deterioration of the protective flux films. Such inspection indicated that the protective flux films had not been removed from the components through flaking, chipping, rubbing off, evaporation or otherwise, and remained clear. Such inspection also indicated that the underlying component surfaces remained clean and non-oxidized.

After the six month period several of the components were fitted together and then soldered together with three different solders (95/5 and 50/50 lead/tin solder and silver solder). All of the resulting soldered joints exhibited excellent characteristics. Other of the sample components were then fitted together with conventional components that had been just previously cleaned and coated with a conventional flux coating a process known as crossfluxing, discussed hereinbelow, and then soldered with the discussed three solders. Again, all the resulting soldered joints exhibited excellent characteristics.

Still other of the six month old sample components were then immersed in water for a period of 24 hours and then allowed to air dry. As a result of such immersion, and drying, the protective flux films turned opaque and lost much of their protective character, but nonetheless remained affixed to the components and soldered joints using the immersed/dryed components exhibited fully satisfactory characteristics.

Further, some of the six month old sample components were then stored, handled, etc. for another six month period, after which time the protective flux films on the components exhibited no degradation, and soldered joints involving the now one year old sample components again exhibited excellent characteristics.

Another very advantageous aspect of the present invention is that the thin protective flux films, as coated on the plumbing, refrigeration and HVAC components, are substantially completely evaporated during subsequent, soldering operations involving the components (mated portions of the components are heated and molten solder is applied thereto). Such complete evaporation of the flux films is achieved because of the simple nature of the flux films (they are comprised of substantially only rosin), and because of the extremely small thickness of the films, which can be precisely, optimally controlled as discussed above.

In contrast, conventional liquid, powder and paste soldering fluxes, as well as the flux incorporated in integral solder/flux do not evaporate during the joining and soldering operations of components. Rather, substantial portions of the conventional fluxes remain on the soldered components, at and around the soldered joints, and must be removed during a conventional, final cleaning step.

Thus, an overall soldering operation according to the present invention is further, substantially simplified in relation to conventional soldering techniques involving conventional soldering fluxes inasmuch as a conventionally required, final cleaning step of removing residual flux from the soldered components is eliminated.

As briefly mentioned in one of the above examples, components prepared according to the present invention may be soldered to other similarly prepared components, or may be soldered together with components prepared by conventional means in so called cross-fluxing soldering operations. Moreover, it is contemplated that components prepared according to the present invention may be joined with other components that have been cleaned but which have not had any flux applied thereto. In such soldering operations it is preferred that the components prepared according to the present invention would have a protective flux film having an increased thickness thereon, to counteract the absence of flux on the components which are to be joined thereto, and that the joining operation be performed quickly after the non-fluxed components have been cleaned.

As also discussed above, it is contemplated that protective flux films according to the present invention may be successfully used for low temperature brazing applications. Particularly, applicant has coated various plumbing, refrigeration and HVAC components with protective flux films according to the present invention and subsequently brazed the components together with a silver/phosphorous/copper, low temperature brazing alloy. The resulting brazed joints exhibited fully satisfactory characteristics.

Although there has been described what are at present considered to be the preferred embodiments of the present invention, it will be understood that the invention can be embodied in other specific forms without departing from the spirit or essential characteristics thereof. The depicted embodiments are, therefore, to be considered in all aspects as illustrative, and not restrictive. The scope of the invention is indicated by the appended claims rather than the foregoing description.

I claim:

1. A flux coating solution for treating a clean metallic component having a fluid channel defined through at least a portion thereof to provide a durable, tack-free, protective flux film on a surface of the component so that the component can be fluid-tightly joined to a mating metallic component at a later time without recleaning and refluxing the component at the later time, the solution consisting essentially of:
   rosin; and
   a highly volatile organic solvent comprising 1, 1, 1, trichloroethane
   said solution being adapted to rapidly air dry when coated on the surface of the component to leave a very thin, tack-free protective flux film on the surface of the component; and
   the protective flux film as deposited on the component, being adapted to be stored for long periods of time, handled, assembled, shaped formed and otherwise worked without removal of the film from the surface of the component and without reduction of the protecting and fluxing properties of the film.

2. A flux coating solution according to claim 1, wherein:
   said flux coating solution is adapted to air dry at normal ambient conditions within one minute when coated on the surface of the component.

3. A flux coating solution according to claim 1, wherein:
   said flux coating solution is adapted to leave a protective flux film having a thickness of 0.001 inch or less on the surface of the component.

4. A flux coating solution according to claim 1, wherein:
   said flux coating solution is adapted to leave a clear protective flux film on the surface of the component.

5. A flux coating solution according to claim 1, wherein:
   said flux coating solution is adapted to leave a very thin, protective flux film which can be stored for months and years without a reduction of the protecting and fluxing properties thereof.

6. A flux coating solution according to claim 1, wherein:
   said flux coating solution is adapted to leave a very thin, protective flux film on the surface of the component which can be exposed to moisture over an extended period of time without removal of the flux film from the component's surface, and with a minor reduction of the film's fluxing properties.

7. A flux coating solution according to claim 1, wherein:
   said flux coating solution is adapted to leave a very thin, protective flux film on the surface of the component which is adapted to be substantially completely evaporated when the component is fluid-tightly joined to a mating component at a later time.

8. A process for preparing a metallic component having a fluid channel defined through at least a portion thereof so that the component can be fluidtightly joined to a mating metallic component at a later time without recleaning and refluxing the metallic component at the later time, the process comprising the steps of:
   providing a metallic component having a fluid channel defined through at least a portion thereof;
   ensuring that a surface of the component is free of contaminants;
   applying a flux coating solution including a flux solute and a highly volatile solvent comprising 1, 1, 1 trichloroethane to the surface of the component; and
   air drying the coating solution under ambient conditions to leave a very thin, tack-free, protective flux film on the surface of the component so that the component can be fluid-tightly joined to a mating metallic component at a later time without recleaning and refluxing of the component at the later time;
   said flux coating solution being adapted to rapidly air dry within one minute under normal ambient conditions when applied to the surface of said component; and
   the very thin, tack-free, protective flux film, as provided on the surface of said component, being capable of being handled, assembled, bent, worked, packaged, stored for long periods of time, shipped, etc., without removal of the protective flux film from the component's surface and without reduction of the film's protective and fluxing properties.

9. A process according to claim 8, wherein:
   said flux coating solution consists essentially of rosin and a highly volatile organic solvent.

10. A process according to claim 8, wherein:

said flux coating solution is applied to said component in at least one dip-dry cycle; and a thickness of the protective flux film on the surface of the component is precisely controlled by controlling the concentration of flux solute in the flux coating solution and by controlling the number of dip-dry cycles through which the component is passed.

11. A process according to claim 10 wherein:

the protective flux film, as provided on the surface of the component, is controlled to have a maximum thickness of 0.001 inch.

12. A process according to claim 8, wherein:

said protective flux film, as provided on the surface of the component, is clear.

13. A process according to claim 8, wherein:

the protective flux film, as provided on the surface of the component, is capable of being exposed to moisture for an extended period of time without removal of the flux film from the component's surface, and with a minor reduction of the film's fluxing properties.

14. A process according to claim 8, wherein:

said component is constructed of a metal including copper.

15. A process according to claim 8, wherein:

said protective flux film, as provided on the surface of the component, is adapted to be substantially completely evaporated when the component is fluid-tightly joined to a mating component at a later time.

16. A process according to claim 8, wherein:

said steps of ensuring that the surface of the component is free of contaminants, applying the flux coating solution to the surface of the component, and air drying the solution are effected in an automated manner.

17. A process according to claim 8, wherein:

said metallic component having the protective flux film thereon is capable of being joined to other metallic components having similar protective flux films thereon, other metallic components having conventional fluxes thereon, and to other unfluxed metallic components which have been cleaned.

18. A process according to claim 8, wherein:

said metallic component having the protective flux film thereon is capable of being joined to other non-fluxed metallic components which have been cleaned.

* * * * *

UNITED STATES PATENT AND TRADEMARK OFFICE
CERTIFICATE OF CORRECTION

PATENT NO. : 4,923,110

DATED : May 8, 1990

INVENTOR(S) : Carmichael et al.

It is certified that error appears in the above-identified patent and that said Letters Patent is hereby corrected as shown below:

```
Column 1, line 67, change "disadvantages" to --disadvantageous--.
Column 2, line 1, change "reasons to --reason--.
Column 5, line 20, after "to" insert --be--.
Column 6, line 4, change "72°0" to --72°--.
Title Page, under OTHER PUBLICATIONS, change "so-so" to --50-50--.
```

Signed and Sealed this

Twenty-second Day of October, 1991

Attest:

HARRY F. MANBECK, JR.

*Attesting Officer*   *Commissioner of Patents and Trademarks*